United States Patent Office 3,089,280
Patented May 14, 1963

3,089,280
TREATMENT OF PLANTS WITH LIGHT-
AFFECTING COMPOSITIONS
Ruth Elizabeth Barry Klaas, Arden Hills, Minn.
(3531 Ridgewood Road, St. Paul 12, Minn.)
No Drawing. Filed June 12, 1959, Ser. No. 819,831
2 Claims. (Cl. 47—58)

This invention relates to novel light-affecting compositions of matter and methods of using same.

In one broad aspect, this invention relates to novel compositions comprising two materials—typically, resonating aromatic substance like optical brightening material, and electronically metastable substance like acrylic plastic—which in combination act in synergistic fashion to produce a greater effect, on and/or by activation by, light of appropriate wave length or wave lengths, than the sum of the effects which might reasonably be expected by consideration of the individual components thereof. In more specific aspects, this invention relates to combinations comprising optical brightening material and acrylic plastic with chlorophyll-containing plants, to combinations comprising optical brightening material and electronically metastable metallic ions, and to other combinations, in all of which cases the total effect observed is greater than the sum of the effects which might reasonably be expected by consideration of the individual components thereof. Novel methods of using such combinations are also set forth herein.

It is a principal object of this invention to provide substantially clear, transparent, and (to the unaided human eye) substantially colorless compositions of matter, comprising acrylic plastic and optical brightening material, and characterized by a very high degree of visual brilliance.

It is a further object of this invention to provide a method of converting light energy by passage through compositions of matter comprising acrylic plastic and optical brightening material.

It is a further object of this invention to provide liquid coating material, and protective coating films formed therefrom which are characterized by a very high degree of visual brilliance, durability, gloss, resistance to abrasion, and other properties which combine to make embodiments of this invention useful as furniture polishes, automobile polishes, floor polishes, shoe polishes, and such like.

Still a furteher object of this invention is to provide plant shine and cleaner which, applied as a coating to the leaves of certain green plants, imparts an essentially permanent, hard and brilliant finish (i.e., plant-shine film) thereto, and which facilitates maintenance of such leaves in a condition of a very high degree of visual brilliance and luster.

Another object of this invention is to provide a method of modifying light supplied to green plants, other chemical systems, and/or such like.

Another object of this invention is to provide a method of modifying the growth of plants—e.g., in speeding growth, increasing crop yield, or such like.

Various other objects, advantages, and features of this invention, such as, for example, the utility of certain of the compositions described herein in hair sprays, will become apparent to those skilled in the pertinent art upon reading this specification and the appended claims. (See, for example, Land, "Experiments in Color Vision," Scientific American, 200, No. 5, pages 89–99 (May 1959); Fortune, LIX, No. 5, pages 144 et. seq. (May 1959); Sears, "Principles of Physics III Optics," Addison-Wesley Press, Inc., Cambridge, 1945; White, "Modern College Physics," third edition, D. Van Nostrand Company, Inc., Princeton, 1956, especially pages 374 to 474.)

All of these objects, and other objects, may be attained by the proper formulation and use of combinations described herein.

As used in this specification and the appended claims, the term "acrylic plastic" is intended to include the true "acrylic" materials (that is, plastics having as a repeating unit in the polymer chains the acrylyl or

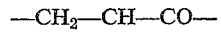

—CH$_2$—CH—CO— group), methacrylic plastics, polymers formed from a plurality of monomers at least one of which, comprising at least about 25 percent by weight of the total, is acrylic monomer, methacrylic monomer, acrylonitrile, or the like, and like polymers. For the purposes of this invention, it will be obvious to those skilled in the art that the essentially transparent blocks or sheets of material disclosed necessarily are based on acrylic plactics that inherently have the property of forming such sheets or blocks, and that the coating materials and films described necessarily are based on acrylic plastics or modifications thereof which inherently have the property of forming films; in other words, the major and surprising aspects of my acrylic plastic/optical brightening material compositions lie in their most unusual and unexpected visual brilliance, their effect on incident light rays, and the synergism of the optical brightening material with the acrylic plastic, or the synergism with such systems as chlorophyll-containing plants. The synergism of the optical brightening material/acrylic plastic system, for example, is most surprising, since it is observed (through visual observation—that is, to an appreciable, commercially important degree) in the case of formulations comprising acrylic plastic, and has not been observed in chemically similar formulations of optical brightening material and polyvinyl acetate plastic, polymerized butadiene-styrene plastic, or the like. (The fact that a synergistic effect is observed, for example, in optical brightening material/polyethyl acrylate systems and not in optical brightening material/polyvinyl acetate systems is especially noteworthy and surprising, since in these two cases the plastics involved are practically isomeric.)

Beyond the above general definition and explanation of the term "acrylic plastic," no attempt is made herein to define the types of acrylic plastics which must be employed to form transparent blocks, or film-forming coating materials, or glazing material, as the case may be, since the type of acrylic plastic needed in each case will be obvious—at least as to general type and physical properties—to those skilled in the art and provided with the benefit of this disclosure: see Billmeyer, "Textbook of Polymer Chemistry," Interscience Publishers, Inc., New York, 1957; Schildknecht, "Vinyl and Related Polymers," John Wiley & Sons, Inc., New York, 1952; Riddle, "Monomeric Acrylic Esters," Reinhold Publishing Corporation, New York, 1954; and bibliographical references in these books. For example, it will be evident to those skilled in the art that the average molecular weights of the plastics of my coating compositions should fall in the range above about 10,000, and preferably in the range of about 150,000 or even higher. Again, polymethacrylate/polyacrylate films of the types described herein tend to have relatively greater visual brilliance if the latices from which such films are deposited contain polymethacrylate and polyacrylate particles of low average particle size (about 0.2 micron or less) and/or relatively low molecular weight (above 10,000 on the average, but averaging below 30,000). I have found that optical brightening material enhances the visual brilliance of polymethacrylate/polyacrylate films of the types described herein to a most marked degree when the latices from which such films are deposited are comprised of polymethacrylate and polyacrylate particles of relatively large average particle size (in the rage of 1 micron or more) and relatively high molecular weight (in the range of 100,000 to 1,000,000 or more).

As used in this specification and the appended claims, the term "optical brightening material" refers to dyestuff which has the property of absorbing ultravoilet radiant energy and re-emitting (fluorescing) light energy in the visible—generally the blue, but in some instances farther toward the red-region of the spectrum, in such a fashion so that the dyestuff contributes (to the unaided human eye) essentially no color at all, or at most no more than a faint suggestion of color, to an object treated with relatively small amounts of said dyestuff. Most of the commercially available dyestuffs of this type are derivatives of diaminostilbene (see U.S. Patent 2,703,-801), dibenzothiophene dioxide (see U.S. Patents 2,563,-493 and 2,702,759), and like materials of complicated molecular structure. For the purposes of this invention, any of the commonly used optical brightening materials is useful, as long as it is physically compatible with the acrylic system; thus, strongly cationic polyelectrovalent optical brightening agents may coagulate, or at least cause long-term instability, in emulsions of acrylic plastic wherein the acrylic latex particles, or emulsifying agents in the latex, contain strongly anionic groups, such as sulfonic and/or carboxylic groups. No attempt, therefore, is made in this disclosure to list all of the possible combinations of acrylic plastic and optical brightening materials, since the general rules and principles of physical compatibility in cases of this type are well understood by those versed in the art of making emulsions. To those versed in the art and provided with the benefit of this disclosure, it will also be evident that some optical brightening materials can be expected to be more effective than others, and that relatively lower concentrations of optical brightening material will be desirable in combinations where transparency is important—as in acrylic plastic/optical brightening material glazing sheets—than in combinations where a lesser degree of transparency suffices—as in plant-shine films.

"Electronically metastable" substance, as that term is used herein, refers to material which, under the conditions set forth, is relatively "electron-rich" or "electron-poor" (e.g., acrylic plastic containing nitrile or carbonyl groups) in such a fashion, and to such a degree, that substantial synergistic interaction with appropriate types of resonating aromatic dyestuff (as described herein) occurs on irradiation of the system with light of the appropriate wave length or wave lengths. It will be readily appreciated, of course, that the condition of "electronic metastability" of any one component of a given system will depend on the conditions of use and the character of other components of the system: chlorophyll, for example, may be affected by the degree and duration of illumination, among other factors.

Essentially colorless, transparent compositions comprising acrylic plastic and optical brightening material, in accordance with my invention, have exceptional visual brilliance, and make attractive decorative substance, construction materials, and such like. Employed as glazing material or other light filter, particularly in thin sheets, my compositions serve to convert ultravoilet radiant energy, and as such are useful adjuncts in the growing of chlorophyll-containing plants, conversion of light (e.g., solar radiaiton) to chemical and/or electrical energy, and such like. Again, liquid coating compositions comprising acrylic plastic and optical brightening material, in accordance with my invention, have shown utility as floor and furniture polishes having greater gloss and visual brilliance than any of the commercial household polishes tested. Moreover, compositions comprising acrylic plastic and optical brightening material, in accordance with my invention, may be applied as plant shine to "shiny-leaved" green plants, to which there is thus contributed a most brilliant gloss and essentially permanent, dust-free plant-shine film. In some instances, plant shine made in accordance with my invention enhances the growth and/or overall yield of the plant.

Various expedients have heretofore been employed in attempts to obtain the visual brilliance and light-conversion effects made available by my invention. For example, attempts have been made to incorporate acrylate material into polish compositions claimed to be suitable for applying glossy finishes on wood, rubber, glass, tile, and linoleum surfaces, either with or without varnish finishes. These attempts have not resulted in general commercial acceptance of the polishes proposed, apparently partly because the polishes did not have adequate apparent gloss and brilliance of visual appearance, and partly because the acrylate (or methacrylate) polymers heretofore proposed as sufficiently hard to retain a good finish under conditions of wear and abrasion (as on floors) had film-forming properties at ordinary temperatures too poor for ease of application by the average housewife. Compositions made in accordance with my invention overcome these difficulties, so that even hard polymers, such as in polymerized methyl methacrylate latices, can be caused to form good polish films, the visual brilliance whereof is enhanced to a most surprising and unexpected degree by the addition of optical brightening material. Again, attempts have heretofore been made to produce good gloss on shiny-leaved household plants, by application of "Vaseline" (petroleum jelly), olive oil, polyvinyl acetate latices, and such like. All of these expedients suffer from the common disadvantage of soon becoming dull and full of dust, or otherwise losing effectiveness; in addition, application of certain of these effectiveness; in addition, application of certain of these preparations (e.g., some petroleum-based plant shines) may stunt or actually kill the plant, perhaps by blocking transpiration through the leaf pores. Acrylic plastic/optical brightening material compositions made in accordance with my invention, however, may be manufactured to have essentially any degree of gloss and visual brilliance desired, from the natural luster of the leaf up to an appearance not dissimilar from green-tinted tin foil. Moreover, the preferred acrylic plastic/optical brightening material compositions of my invention dry to a hard, dust-free finish, and remain so for at least eleven months after application, in a state such that quick dusting with a feather duster serves to bring out essentially all of the original luster and brilliance of the coated plants. Most surprisingly, these effects are not obtained, at least at any practical degree of loading with optical brightening material, with any latices other than latices of acrylic plastic. Thus, polymerized styrene-butadiene latices, polyvinyl acetate latices, polyvinyl chloride latices, and such like perform very poorly in comparison, even in combination with large amounts of optical brightening material, whereas inclusion of even relatively small amounts of acrylic substance—at least about 25 percent by weight—along with optical brightening material in the polymer immediately produces the synergistic effect of my invention. This effect is most evident in comparison of compositions comprising optical brightening material and high-acrylic plastic (as polyethyl acrylate), medium-acrylic plastic (as certain polymerized butadiene-acrylonitrile latices), and/or low-acrylic plastic (as blends of polyalkyl acrylate latices with polyvinyl acetate latices, or terpolymer dispersions containing substantialy less than 30 mole percent of acrylic moieties in the polymer), with composition comprising optical brightening material and such standard polymer dispersions as latices of polyvinyl acetate, polyvinyl chloride, or such like.

My invention will be further illustrated by the following specific examples, which set forth—among other things—preparation of various acrylic plastic/optical brightening material compositions and methods of using same. It should be understood, however, that while preferred embodiments of my invention are set forth among the following examples, these are given primarily for purposes of illustration, and that variations and substitution of equivalents may be resorted to within the scope of the appended claims.

It should further be understood at the outset that examples known in the prior art are included in following tables simply for the sake of comparison with embodiments of my invention, to show the advantages and utility thereof.

Finally, it should be kept in mind that, by minor modifications of formulations and/or formulating technique, certain of the examples herein shown to give unstable or gelled latices, or such like, in many cases very probably could be improved substantially in physical appearance and stability; a major point of the examples, however, is that the visual brilliance of acrylic compositions can be improved in important degree by the addition of small amounts of optical brightening material, whereas the optical brightening material has essentially no effect, or actually deleterious effect, on the appearance of othere chemical plastics tested.

It is worthy of note that suitable acrylate film-forming latices are herein shown to be generally superior to all other polymer classes tested as plant shines. In addition, it has been found that the substantial improvement in apparent gloss and visual brilliance, effected by adding appropriate optical brightening material to acrylic plant shine, appears most marked after a period of time, and that outstanding visual brilliance is best obtained by applying at least two coats of the acrylic plastic/optical brightening material plant shine to the "shiny leaved" plants, preferably with two to four weeks between coats. Commercial acrylic latices have been found to differ greatly, even from batch to batch of the same product, in respect to suitability for plant-shine formulations (perhaps because of variations in average molecular weight and/or particle size and/or such like). Suitable acrylic plastic/optical brightening material formulations invariably have given plant-shine films of outstanding gloss visual brilliance, whereas formulations lacking the optical brightening material but identical in all other respects have given plant-shine films of inferior gloss and brilliance, even though the latter may be rated at acceptable in comparison to currently available commercial plant shines.

FIRST SERIES OF EXAMPLES

Five hundred and forty grams distilled water was charged into a 1-liter reaction flask fitted with gas inlet tube, mechanical stirrer, and reflux condenser. Three grams lauryl sulfate was dispersed in the water, and 86 grams methyl methacrylate monomer then added. Stirring was commenced at a rate of 300 revolutions per minute, the system flushed with nitrogen gas, and heated to 50° C. One gram potassium persulfate and 0.3 gram sodium bisulfite were added, and the temperature raised to 60° C. over a period of 10 minutes with continued mechanical agitation and flushing with nitrogen. Over the next 40 minutes, the temperature was gradually raised to 75° C., and an additional 0.3 gram potassium persulfate and 0.1 gram sodium bisulfite were then added. Finally, the temperature was raised to 90° C. over a period of 10 minutes, and the reaction mass then cooled to room temperature. The product of this reaction was a finely dispersed emulsion of polymethyl methacrylate (more accurately, methyl polymethacrylate) having about 10.7 percent of polymer solids by weight. This emulsion was assigned the designation "Latex A."

The polymer of "Latex A" was characterized by air-drying a sample on a polyperfluoroethylene release film over anhydrous calcium chloride, and then noting its brittle point (in degrees centigrade), its swelling-solubility characteristics in o-xylene and o-xylene/benzene, and the viscosity of an o-xylene solution containing 2.5 percent by weight of the polymer, in comparison with a commercial standard. On the basis of these measurements, the average molecular weight of the polymer of "Latex A" was estimated to be approximately 12,000.

Seventy grams of "Latex A" were heated to 95° C. on a water bath, 2 grams of oleic acid dispersed therein, and next 1.25 grams morpholine added. The dispersion was shaken vigorously, and cooled to room temperature with shaking. This dispersion was assigned the designation "Latex B."

To 73.5 grams of "Latex B," prepared as described above, there were added 3 grams of a dyestuff prepared as described in Example 3 of U.S. Patent 2,703,801, and assigned the designation—for the purposes of this disclosure—"Optical Brightening Material I," which material, perhaps less conveniently, could be known as the sodium salt of [2,4-di-O-phenoxy-1,3,5 triazyl (6)] diaminostilbenedisulfonic acid—i.e., a derivative of the sodium salt of [2,4-dichloro 1,3,5 triazyl (6)] diaminostilbenedisulfonic acid in which the chlorine atoms have been replaced by phenoxy groups bound to the triazyl rings through the oxygen atoms of the phenoxy groups. The resultant formulation was assigned the designation "Latex C."

All three of these latices were then tested as polishes, by noting apparent gloss and visual brilliance of the films (if any) obtained on drying for 1 hour on smooth varnished pine wood, on asphalt floor tile, and on shoe leather finished in the usual manner and ready for polishing.

Table I

| Ex. No. | Polish employed | Overall quality of polish finish | | |
|---|---|---|---|---|
| | | On varnished wood | On asphalt tile | On shoe leather |
| 1 | Latex A | Chalky | Chalky | Fair. |
| 2 | Latex B | Good | Fair to good | Equals standard. |
| 3 | Latex C | Very good | Good | Do. |

In all cases of Example 3 above, the finish obtained had visual brilliance and gloss superior or at least equal to standard—i.e., equal to that obtained by use of a standard commercial polish sold for the specific end-use under test. (Thus, the "standard" to which there is reference in the fifth vertical column of Table I was a popular brand of liquid shoe polish found to be about average in respect to gloss and visual brilliance among all shoe polishes tested.)

SECOND SERIES OF EXAMPLES

"Latex D" was made by exactly the same procedure as that used in the preparation of "Latex A," except that ethyl acrylate monomer, rather than methyl methacrylate monomer, was polymerized. The polyethyl acrylate (more accurately, ethyl polyacrylate) obtained was characterized by methods analogous to those employed in characterizing the polymer of "Latex A" above. The average molecular weight of the polymer of "Latex D" was estimated to be about 11,000. (See Riddle, "Monomeric Acrylic Esters," Reinhold Publishing Corp., New York, 1954, page 63; Billmeyer, "Textbook of Polymer Chemistry," Interscience Publishers, Inc., New York, 1957, pages 128 to 139.)

"Latex E" was made by mixing equal volumes of "Latex A" and "Latex D."

"Latex F" was prepared by adding to 100 grams of "Latex A" 4 grams of a dyestuff prepared as described in Example 1 of U.S. Patent 2,703,801, and assigned the designation—for the purposes of this specification—"Optical Brightening Material II," which material, perhaps less conveniently, could be known as the sodium salt of [2-O-phenoxy-4-N-morpholinyl 1,3,5 triazyl (6)]diaminostilbenedisulfonic acid—i.e., a derivative of the sodium salt of [2,4-dichloro 1,3,5 triazyl (6)]diaminostilbenedisulfonic acid in which one of the two chlorine atoms attached to each triazyl ring has been replaced by a phenoxy group bound to the triazyl ring through oxygen of the phenoxy group, while the other chlorine atom attached to each triazyl ring has been replaced by a morpholinyl group bound to the triazyl ring through the nitrogen of the morpholinyl group.

"Latex G" was prepared by adding to 100 grams of "Latex D" 4 grams of "Optical Brightening Material II."

"Latex H" was prepared by adding to 100 grams of "Latex E" 4 grams of "Optical Brightening Material II."

Various latices were then compared as polishes on varnished wood, on asphalt tile, on shoe leather, and on the upper surfaces of the leaves of the green plant *Pothos aureus*.

Table II

| Example No. | Polish employed | Characteristics of film | Overall rating as polish |
| --- | --- | --- | --- |
| 4 | Latex A | Milky; chalks | Very poor. |
| 5 | Latex D | Soft; some tack | Poor. |
| 6 | Latex E | Good smooth film | Fair. |
| 7 | Latex F | Milky; chalks | Poor. |
| 8 | Latex G | Soft; some tack | Do. |
| 9 | Latex H | Good smooth film | Good. |

THIRD SERIES OF EXAMPLES

In this series of examples, optical brightening materials were employed in photochemical processes. It will be obvious to those versed in the art that my compositions comprising optical brightening material and/or acrylic plastic could be employed with similar advantage in photoelectric processes somewhat analogous to the photochemical processes described below.

EXAMPLE 10

"Film H" (approximately 2 mils thick) was prepared by evaporating to dryness, at room temperature on a polyperfluoroethylene release film, a layer of "Latex H" approximately 16 mils thick. Metal cans approximately 2 inches in diameter and 3 inches high were two-thirds filled with loose, moist black soil from Arden Hills, Minnesota, and 10 seeds of "Early Scarlet Globe" radish planted therein at a depth of about 3/8 inch. The tops of the cans were then closed with "Film H," and exposed to the direct rays of the sun, at about 45° N. latitude, for approximately 4 hours daily for 21 days, with occasional watering of the plants through holes provided in the sides of the cans. At intervals during this growing process, the plants were exposed (through the films, of course) to the rays of a 275-watt ultra-violet (mercury-arc) lamp at a distance of 4 inches above the films. Radishes were successfully grown in these miniature greenhouses; less favorable results were obtained in parallel experiments with carrot ("Danvers Half Long—Improved Red Core Strain") and lettuce ("Black Seeded Simpson") seeds. (Great care must be taken, of course, in handling miniature greenhouses of this type, to control air temperature—particularly under the mercury-arc lamp—and to watch out for mold growth, and such like. Best results are obtained when adequate ventilation is provided under the films.)

EXAMPLE 11

In this example, three pots of loose black soil from Arden Hills, Minnesota, were planted with 12 radish seeds ("Early Scarlet Globe") per pot, and exposed to the rays of the sun, at approximately 45° N. latitude, for approximately 4 hours per day over a period of 30 days. On the first day, 100 milliliters of aqueous liquid was supplied to each pot. On the fifth, seventh, eleventh, thirteenth, fourteenth, seventeenth, twentieth, and twenty-second days of the experiment, 50 milliliters of aqueous liquid was supplied to each pot. In each case, the first pot was sprinkled (on top of the plants, if any) with an aqueous solution having 1 percent by weight of "Optical Brightening Material III," a commercial optical brightening material equivalent for the purposes of this invention to the above-described "Optical Brightening Material I"; the second pot was irrigated (at the base of the plants, if any) with the aforesaid aqueous solution having 1 percent by weight of "Optical Brightening Material III"; and the third pot was irrigated (at the base of the plants, if any) with plain water taken from a well 92 feet deep in Arden Hills, Minnesota. At the end of the experiment, all of the plants were uprooted from all pots and carefully washed and weighed. The highest total plant weight, by an appreciable margin, was obtained in the case of the pot to which a solution of optical brightening material had been supplied by sprinkling. At the very least, this experiment indicated that "Optical Brightening Material III" is not grossly toxic to the growth of the plants under test, and a similar indication was obtained in parallel tests on carrots ("Danvers Half Long—Improved Red Cored Strain," seeds of which were obtained from a well-known seedsman). Sprinkling the leaves of cuttings of *Pothos aureus*, or immersing the stems of cuttings of *Pothos aureus*, or sprinkling the leaves of mature *Pothos aureus* rooted in black soil of Arden Hills, Minnesota, or irrigating the roots of mature *Pothos aureus* rooted in black soil of Arden Hills, Minnesota, with (in each case) aqueous solution having 1 percent by weight of "Optical Brightening Material III" appeared to have much less effect on the growth of said plants than coating the leaves of *Pothos aureus* with acrylic plastic/optical brightening material compositions. In one case, coating the leaves of a mature *Pothos aureus* plant (rooted in black soil of Arden Hills, Minnesota) with a thin film of an acrylic plastic/optical brightening material composition (comprising 48 percent by weight of a commercial polymethacrylate latex equivalent to "Latex A," 48 percent by weight of a commercial polyacrylate latex equivalent to "Latex D," and 4 percent by weight of "Optical Brightening Material III"), and allowing said film to dry to a lustrous finish, produced within a few months' time a most remarkable doubling and even tripling of the size of the leaves of the plant, and in no detectable way did the luster, brilliance, or appearance of said leaves decrease over a period of eleven months of observation. (Parallel results were obtained in parallel experiments with about 20 other *Pothos aureus* plants, treated with various combinations of various optical brightening materials and various acrylic plastics.) Moreover, plants so treated prospered, and appeared thriving and healthy, as compared to a previous history of over 4 years of growing under exactly the same conditions with no notable deviations of the leaves from normal size, or the like. Roughly similar effects were noted on coating leaves of Nephthytis, which plants grew up to be twice as full as previously, and produced green lustrous leaves of remarkably increased size. Less pronounced effects on size were produced by coating *Sansevieria hahnii* plants.

EXAMPLE 12

In this example, an effort was made to establish possible parallelism between the interaction of optical brightening material and chlorophyll, and a Riggs-Weiss irradiation demonstration, as modified by the use of optical brightening material. (See Riggs and Weiss, J. Chem. Phys., 20, 1194–99 (1952); Weiss, Nature, 136, 794 (1935). For discussion of the similarity of chlorophyll to biochemical iron-bearing material capable of easily reversible oxidation, see Fieser and Fieser, "Organic Chemistry," third edition, Reinhold Publishing Corp., New York, 1956, pages 484 to 487 and pages 455 to 458.)

Two glass tubes, one inch in diameter by three and three-fourth inches long, each closed on one end only, were filled half-way with an aqueous solution 0.1 molar with respect to ferrous sulfate and 0.3 normal with respect to sulfuric acid. The void spaces in the tubes were then flushed out with nitrogen, and the tubes closed with 1-mil films: the first tube with 1-mil "Film H–1" (made from "Latex H"), and the second tube with 1-mil "Film E," which had been prepared by a drying of "Latex E" in a procedure analogous to that employed in making "Film H" and "Film H–1" from "Latex H." Both tubes were then irradiated with a 275-watt ultraviolet (mercury-arc) lamp located 1 inch directly above the films. Two mature *Pothos aureus* plants, coated respectively with "Latex E" and "Latex H" were irradiated under the same lamp in similar fashion. Visual inspection of the two tubes, and of the *Pothos aureus* plants during and after 1 hour of irradiation under the conditions described, indicated that only slight differences could be obtained through the use of optical brightening materials under the conditions of this test. Generally parallel results were obtained by irradiation, at a distance of 4 inches under a 275-watt ultraviolet (mercury-arc) lamp, on the one hand of an aqueous solution ("solution 12X") 0.1 molar with respect to ferrous sulfate and 0.3 normal with respect to sulfuric acid, and on the other hand of an aqueous solution ("12Y") 0.1 molar with respect to ferrous sulfate, 0.3 normal with respect to sulfuric acid, and containing 0.1 percent by weight of "Optical Brightening Material I." On dilution and slow neutralization of the two solutions with very dilute standard sodium hydroxide solution, there developed in "12X" but not in "12Y," just before precipitation of voluminous amounts of blue-green ferrous hydroxide, a yellowish tinge—apparently ferric hydroxide. It will be obvious to those versed in the art and provided with the benefit of this disclosure that just as inclusion of optical brightening material in systems of this general type has the effect of tending to desensitize the systems to Riggs-Weiss-type action under ultraviolet light, so would material giving rise to substantial amounts of anti-Stokes fluorescence have the effect of sensitizing such systems to Riggs-Weiss-type activity on irradiation by light of longer wave lengths, and thus make possible an increase in the sensible yield of usable chemical and/or electrical energy, or such like, therefrom.

The effect of the optical brightening material in "Film H" and "Film H–1" above, of course, was to shift the preponderance of radiation actually hitting the iron- or chlorophyll-containing entities from the ultraviolet range toward the visible and infra-red regions, with evident advantages in various analogous utilization of such energy; such utilizations (employing infra-red more advantageously than radiation of shorter wave length) might include, for example, certain processes for solar distillation of sea water. In other instances, dyestuffs "reversing" the action of typical optical brightening materials of course could be selected to shift part of the incident radiation to the far ultraviolet, with increased efficiency, rather than decreased efficiency, in photochemical conversions typified by the Riggs-Weiss work. Such so-called "anti-Stokes" fluorescence, according to currently accepted theories, occurs as long as the exciting light excites a specific fluorescence at all, so that the whole band of fluoresced light, including any part thereof in the far ultraviolet and/or of shorter wave length than the exciting light, is emitted. Moreover, it is evident to one versed in the pertinent art and provided with the benefit of this disclosure that "screens" of material generally similar to "Film H"—that is, screens for converting ultraviolet energy into energy having wave lengths closer toward the visible and infra-red regions of the spectrum—have particular utility where ultraviolet radiation constitutes an appreciable proportion of the incident light, as in tropical latitudes at high altitudes and even more as in outer space (Koller, "Ultraviolet Radiation," John Wiley & Sons, Inc., New York, 1952), as on space ships or the like. In growing chlorophyll-containing and/or other living organisms at a lunar station, for example, there will most probably be need of a "screen" which would make usable all possible energy during the long lunar day, and yet screen out at least the most lethal high-energy ultraviolet. More mundane applications, as in terrestrial greenhouses, will also be evident.

FOURTH SERIES OF EXAMPLES

In this series of examples, formulations comprising various optical brightening materials and various plastics were tested as plant shines on a variety of green plants.

"Latex I" was a commercial polymethacrylate latex generally equivalent to "Latex A," but supplied at a solids content of 38 percent, and an average particle size of about 0.1 micron. The average molecular weight of the polymer of "Latex I," as estimated by the same methods used for estimation of the molecular weight of the polymer in "Latex A," was in the range somewhat above 100,000. Unless otherwise specified, the average molecular weights of the other commercial latices herein described may be assumed to lie in the range from about 100,000 to about 1,000,000. Certain latices, however, have been supplied at average molecular weights below 50,000.

"Latex J" was a commercial polyacrylate latex generally equivalent to "Latex D," but supplied at a solids content of 46 percent, and an average particle size of about 0.1 micron. The average molecular weight of the polymer of "Latex J," as estimated by the same methods described above for the estimation of the average molecular weight of the polymer of "Latex A," was in the range somewhat above 100,000.

"Latex K" was a physical mixture comprising 50 parts by volume of "Latex I" and 50 parts by volume of "Latex J."

"Dispersion L" was an aqueous dispersion having 4 percent by weight of commercial polyvinyl alcohol having a molecular weight such that the viscosity of the 4 percent dispersion at 20° C., as measured by the Hoeppler falling-ball method, was about 50 centipoises, and said polyvinyl alcohol having a degree of hydrolysis of about 98.3 percent. Methods of making polyvinyl alcohol equivalent to the grade used here are well known to those versed in the art: see Schildknecht, "Vinyl and Related Polymers," John Wiley & Sons, Inc., 1952—especially pages 341–4.

"Latex M" was a commercial aqueous dispersion (latex) of polyvinyl acetate, supplied at a solids content of 55 percent and a viscosity of about 1200 centipoises at 77° F., and having an average particle size of about 0.5 micron. Methods of making polyvinyl acetate emulsions equivalent to "Latex M" are well known to those versed in the art: see Schildknecht, op cit., pages 333–4.

"Latex N" was a commercial vinyl acetate-acrylic terpolymer emulsion, supplied at a solids content of about 55 percent, having a viscosity of about 60 centiposies at 77° F., and characterized by an average particle size of about 0.3 micron. Methods of making vinyl acetate-acrylic terpolymer emulsions equivalent to "Latex N" are well known to those versed in the art: see Schildknecht, op. cit., page 367.

"Latex O" was a commercial polymerized butadiene-styrene latex, polymerized from monomers in the ratio of 15 parts butadiene to 85 parts styrene, supplied at a solids content of 52 percent, having a viscosity of about 62 centipoises at 77° F., and having an average particle size of about 0.15 micron. Methods of making polymerized butadiene-styrene latices equivalent to "Latex O" are well known to those versed in the art: see Schildknecht, op. cit., pages 84–122.

"Latex P" was a commercial polymerized butadiene-acrylonitrile latex, polymerized from monomers in the approximate ratio of 70 parts butadiene to 30 parts acrylonitrile, supplied at a solids content of about 40 percent, having a viscosity of about 12 centipoises at 77° F., and having an average particle size of about 0.12 micron. Methods of making polymerized butadiene-acrylonitrile latices equivalent to "Latex P" are well known to those versed in the art: see Schildknecht, op. cit., pages 286 to 290.

"Latex Q" was a commercial polyvinyl chloride latex, internally plasticized by use of about 10 parts of vinyl acetate comonomer per 90 parts of vinyl chloride monomer, supplied at a solids content of about 52 percent, having a viscosity of about 34 centipoises at 77° F., and being characterized by an average particle size of about 0.1 micron. (See Schildknecht, op. cit., page 398 et seq.)

"Latex R" was a commercial polymerized butadiene-acrylonitrile latex polymerized from monomers in the approximate ratio of 67 parts butadiene to 33 parts acrylonitrile, having a solids content of about 42 percent, having a viscosity of about 20 centipoises at 77° F., and being characterized by an average particle size of about 0.25 micron. Methods of making polymerized butadiene-acrylonitrile latices equivalent to "Latex R" are well known to those versed in the art: see Schildknecht, op. cit., pages 286 to 290.

"Latex S" was a commercial vinyl acetate/vinyl stearate copolymer emulsion having the approximate ratio of 1 stearate group per 9 acetate groups, supplied at a solids content of about 55 percent, having a viscosity of about 400 centipoises at 77° F., and being characterized by an average particle size of about 0.5 micron. Methods of making emulsions of this type are well known to those versed in the art: see Schildknecht, op. cit., pages 365 to 381; W. Haehnel and W. O. Herrmann, German Patent 480,866; and A. Voss and W. Starck, German Patent 577,284.

"Dispersion T" was an aqueous dispersion having 10 percent by weight of polyvinylpyrrolidone, said polyvinylpyrrolidone having an average molecular weight of about 40,000. Methods of making dispersions of polyvinylpyrrolidone equivalent to "Dispersion T" are well known to those versed in the art: see Schildknecht, op. cit., pages 663 to 667.

"Dispersion X" was a dispersion of polyethyl acrylate in xylene/benzene (90/10), said polyethyl acrylate (more accurately, ethyl polyacrylate) comprising 2 percent by weight of the dispersion, and having an average molecular weight of about 100,000 or somewhat above. (See directions for making "Latex D" above.) The polymer was made in aqueous emulsion, most of the water dried off in air at room temperature, and the rest of the water then taken off over anhydrous calcium chloride over a period of about 100 days. The remaining polymer was then dispersed in the aromatic solvent.

"Optical Brightening Material IV" is the designation given—for the purposes of this specification—to a dyestuff capable of absorbing ultraviolet and fluorescing longer wave lengths, prepared as described in Example 5 of U.S. Patent 2,703,801, which dyestuff, perhaps less conveniently, could be known as the sodium salt of [2-O-phenoxy-4-N-piperidyl-1,3,5 triazyl (6)] diaminostilbenedisulfonic acid—i.e., a derivative of the sodium salt of [2,4-dichloro 1,3,5 triazyl (6)] diaminostilbenedisulfonic acid in which one of the two chlorine atoms attached to each triazyl ring has been replaced by a phenoxy group, while the other chlorine atom attached to each triazyl ring has been replaced by a piperidyl group attached to the triazyl ring through the nitrogen of the piperidyl group.

A series of polishes were then made up, comprising all possible latex (or dispersion)/aromatic modifier combinations of "Latex A," "Latex D," "Latex I," "Latex J," "Latex K," "Dispersion L," "Latex M," "Latex N," "Latex O," "Latex P," "Latex Q," "Latex E," "Latex R," "Latex S," Dispersion T," and "Dispersion X," respectively, with, respectively, "Optical Brightening Material I," "Optical Brightening Material II," "Optical Brightening Material III," "Optical Brightening Material IV," a variety of commercial optical brightening materials sold under various trade names, alpha-naphthaleneacetic acid, ultraviolet absorbers such as 2-hydroxy-4-methoxybenzophenone, or 2,2'-dihydroxy-4-methoxybenzophenone, fluorescein, eosin, 4,4'-diaminostilbene-2,2'-disulfonic acid (and sodium and potassium salts thereof), rhodamine B ("rhodamine B extra," or the hydrochloride of "diethyl m-aminophenol phthalein"), and so forth. Basic formulation employed in making these polishes was as follows:

| | |
|---|---|
| Latex (or dispersion)_____ml__ | 100 |
| Water [1] _____ml__ | 100 |
| Non-ionic surfactant [1] (as obtained by reacting 25 moles ethylene oxide with octylphenol)_____g__ | 1 |
| Modifier (e.g., dyestuff as optical brightening material) _____g__ | 8 |
| Polymerized dimethylsilanediol defoamer [2]____g__ | 0.05 |

[1] Omitted in formulations comprising "Latex A," "Latex D," "Latex E," "Dispersion L," "Dispersion T," or "Dispersion X."
[2] Optional. For general method of preparation of defoamers of this type, see McGregor, "Silicones and Their Uses," McGraw-Hill Book Company, Inc., New York, 1954, especially pages 272–276. More detailed descriptions of the methods applicable in the manufacture of silicone defoamers may be found in standard reference works on the subject. Although optional, addition of silicone defoamer (described in greater detail hereafter) prevents foaming which might be occasioned by inclusion of the polyethoxylated octylphenol surfactant.

Formulations made as described above were tested in all cases as plant shines on one or more of the following plants, in the living room of a residence facing east-southeast in Arden Hills, Minnesota: *Pothos aureus, Sansevieria hahnii*, Nephthytis, *Parthenocissus tricuspidata, Hedera helix*, and on a common variety of cut-leaf Philodendron. Some of these formulations, and/or obvious modifications thereof typified by ammonia-shellac cut-back polishes or furniture cream polishes (see Minrath, "Van Nostrand's Practical Formulary," D. Van Nostrand Co., Inc., Princeton, 1957, and "Emulsions and Detergents," ninth edition, Union Carbide Corporation, New York, 1955) were also evaluated as floor polishes, furniture polishes, and such like. Moreover, variations in these basic formulations were made in content of acrylic plastic, ammonia-shellac dispersion, optical brightening material, and so forth, over a wide range of concentrations and types of materials. Typical tabulations of results obtained are shown in Tables III, IV, and V. In these tables, "Optical Brightening Material I" is shown as "Modifier I," "Optical Brightening Material II" as "Modifier II," "Optical Brightening Material III" as "Modifier III," "Optical Brightening Material IV" as "Modifier IV," rhodamine B ("Extra"—i.e., the hydrochloride) as "Modifier V," fluorescein as "Modifier VI," and 2,2'-dihydroxy-4-methoxybenzophenone as "Modifier VII." Of all these cases, remarkable visual brilliance was obtained in coatings comprising acrylic plastic and optical brightening material within the limits set forth, and all other coatings were found to be unsatisfactory by comparison. Evaluations of the various plant shines, as set forth in Table III, indicated performance on *Pothos aureus* to parallel performance on *Hedera helix*, and for the purposes of Table III, these two plants are considered as equivalents in evaluation of ease of application and final gloss, but not necessarily in long-term effects of the plant-shines on the respective classes of plants.

In treating blends of various polymers—e.g., ethyl polyacrylate and polyvinyl acetate, it was found that addition of appropriate amounts of optical brightening material brings about the synergistic effects of this invention as long as the acrylic plastic comprises at least about 25 percent by weight (solids basis) of the polymer blend.

Performance ratings ("Good," "Fair," and so forth) employed in the following tables give valid comparisons within the respective tables, but do not reflect comparative performance with the same terms between polishes in different tables.

Unless otherwise specified, all formulations herein were made by simple mixing of the ingredients shown, generally in the order as given from left to right, or from top to bottom.

Table III

| Ex-No. | Latex or dispersion | Modifier | Comments on performance as plant shine on *Pothos aureus* and/or *Hedera helix*) leaves | |
|---|---|---|---|---|
| | | | Immediately after Application | 24 hours after application |
| 13[1] | A | None | Poor; dull | Poor; dull. |
| 14[1] | A | I | ----do---- | Do. |
| 15[1] | A | II | ----do---- | Do. |
| 16[1] | A | III | ----do---- | Do. |
| 17[1] | A | IV | ----do---- | Do. |
| 18[1] | A | V | Poor; dull; discolored | Poor; dull; discolored. |
| 19[1] | A | VI | ----do---- | Do. |
| 20[1] | A | VII | Poor; dull | Poor; dull. |
| 21[1] | D | None | Fair; tacky | Fair; tacky. |
| 22[1] | D | I | Fairly good; some tack | Fairly good; some tack. |
| 23[1] | D | II | ----do---- | Do. |
| 24[1] | D | III | ----do---- | Do. |
| 25[1] | D | IV | ----do---- | Do. |
| 26[1] | D | V | Poor; tacky; discolored | Poor; tacky; discolored. |
| 27[1] | D | VI | ----do---- | Do. |
| 28[1] | D | VII | Fair; tacky | Fair; tacky. |
| 29[1] | E | None | Fairly good | Fairly good. |
| 30[1] | E | I | Very good | Very good. |
| 31[1] | E | II | ----do---- | Do. |
| 32[1] | E | III | ----do---- | Do. |
| 33[1] | E | IV | ----do---- | Do. |
| 34[1] | E | V | Poor; red; discolored | Poor; red; discolored. |
| 35[1] | E | VI | Poor; orange; discolored | Poor; orange; discolored. |
| 36[1] | E | VII | Fairly good | Fairly good. |
| 37 | I | None | Very poor; dull | Very poor; dull. |
| 38 | I | I | Poor; dull | Poor; dull. |
| 39 | I | II | ----do---- | Do. |
| 40 | I | III | ----do---- | Do. |
| 41 | I | IV | ----do---- | Do. |
| 42 | I | V | Poor; dull; discolored | Poor; dull; discolored. |
| 43 | I | VI | ----do---- | Do. |
| 44 | I | VII | Quite poor; dull; milky | Quite poor; dull milky. |
| 45 | J | None | Poor to fair; some tack | Poor to fair; some tack. |
| 46 | J | I | Fair; tacky | Fair; tacky. |
| 47 | J | II | ----do---- | Do. |
| 48 | J | III | ----do---- | Do. |
| 49 | J | IV | ----do---- | Do. |
| 50 | J | V | Poor; tacky; discolored | Poor; tacky; discolored. |
| 51 | J | VI | ----do---- | Do. |
| 52 | J | VII | ----do---- | Do. |
| 53 | K | None | Fairly good | Fairly good. |
| 54 | K | I | Very good | Very good. |
| 55 | K | II | ----do---- | Do. |
| 56 | K | III | ----do---- | Do. |
| 57 | K | IV | ----do---- | Do. |
| 58 | K | V | Poor; red discolored | Poor; red; discolored. |
| 59 | K | VI | Poor; Orange; discolored | Poor; orange; discolored. |
| 60 | K | VII | Fairly good | Fairly good. |
| 61 | L | None | Poor; dull | Poor; dull. |
| 62 | L | I | ----do---- | Do. |
| 63 | L | II | ----do---- | Do. |
| 64 | L | III | ----do---- | Do. |
| 65 | L | IV | ----do---- | Do. |
| 66 | L | V | Poor; dull; discolored | Poor; dull; discolored. |
| 67 | L | VI | ----do---- | Do. |
| 68 | L | VII | Poor; dull | Poor; dull. |
| 69 | M | None | Poor; very dull | Poor; very dull. |
| 70 | M | I | ----do---- | Do. |
| 71 | M | II | ----do---- | Do. |
| 72 | M | III | ----do---- | Do. |
| 73 | M | IV | ----do---- | Do. |
| 74 | M | V | Poor; dull; discolored | Poor; dull; discolored. |
| 75 | M | VI | ----do---- | Do. |
| 76 | M | VII | Poor; very dull | Poor; very dull. |
| 77 | N | None | Good; tacky | Good. |
| 78 | N | I | Very good; some tack | Very good; bright. |
| 79 | N | II | ----do---- | Do. |
| 80 | N | III | ----do---- | Do. |
| 81 | N | IV | ----do---- | Do. |

Table III—Continued

| Ex-No. | Latex or dispersion | Modifier | Comments on performance as plant shine on *Pothos aureus* and/or *Hedera helix*) leaves H | |
|---|---|---|---|---|
| | | | Immediately after Application | 24 hours after application |
| 82 | N | V | Poor; red discolored | Poor; red; discolored. |
| 83 | N | VI | Poor; orange; discolored | Poor; orange; discolored. |
| 84 | N | VII | Good; slight tack | Good. |
| 85 | O | None | Poor; milky | Poor; milky. |
| 86 | O | I | ----do---- | Do. |
| 87 | O | II | ----do---- | Do. |
| 88 | O | III | Poor; milky; coagulated | Poor; milky; coagulated. |
| 89 | O | IV | Poor; milky | Poor; milky. |
| 90 | O | V | Poor; milky; red | Poor; milk ; red. |
| 91 | O | VI | Poor; milky; orange | Poor; milky; orange. |
| 92 | O | VII | Poor; milky | Poor; milky. |
| 93 | P | None | Good; fairly bright | Good; fairly bright. |
| 94 | P | I | Very good; bright | Very good; bright. |
| 95 | P | II | ----do---- | Do. |
| 96 | P | III | ----do---- | Do. |
| 97 | P | IV | ----do---- | Do. |
| 98 | P | V | Poor; red; discolored | Poor; red; discolored. |
| 99 | P | VI | Poor; orange; discolored | Poor; orange; discolored. |
| 100 | P | VII | Good; fairly bright | Good; fairly bright. |
| 101 | Q | None | Poor; milky; spotty | Poor; milky; spotty. |
| 102 | Q | I | Poor; milky | Poor; milky. |
| 103 | Q | II | ----do---- | Do. |
| 104 | Q | III | ----do---- | Do. |
| 105 | Q | IV | ----do---- | Do. |
| 106 | Q | V | Poor; red; discolored | Poor; red; discolored. |
| 107 | Q | VI | Poor; orange; discolored | Poor; orange; discolored. |
| 108 | Q | VII | Poor; milky | Poor; milky. |
| 109 | R | None | Fairly good | Fairly good. |
| 110 | R | I | Good | Good. |
| 111 | R | II | Very good | Very good. |
| 112 | R | III | ----do---- | Do. |
| 113 | R | IV | ----do---- | Do. |
| 114 | R | V | Poor; red; discolored | Poor; red; discolored. |
| 115 | R | VI | Poor; orange discolored | Poor; orange; discolored. |
| 116 | R | VII | Fairly good | Fairly good. |
| 117 | S | None | Very poor; dull | Very poor; dull. |
| 118 | S | I | ----do---- | Do. |
| 119 | S | II | ----do---- | Do. |
| 120 | S | III | ----do---- | Do. |
| 121 | S | IV | ----do---- | Do. |
| 122 | S | V | Very poor; red discolored | Very poor; red; discolored. |
| 123 | S | VI | Very poor; discolored | Very poor; discolored |
| 124 | S | VII | Very poor; dull | Very poor; dull. |
| 125 | T | None | Fair to poor | Fair to poor. |
| 126 | T | I | Fair | Fair. |
| 127 | T | II | ----do---- | Fair to poor. |
| 128 | T | III | ----do---- | Fair. |
| 129 | T | IV | ----do---- | Fair. |
| 130 | T | V | Poor; red; discolored | Poor; red; discolored. |
| 131 | T | VI | Poor; orange discolored | Poor; orange; discolored. |
| 132 | T | VII | Fair to poor | Fair to poor. |
| 133 | X | None | Fair | Fair. |
| 134 | X | I | Fair to good | Fair; some dye in solubility. |
| 135 | X | II | ----do---- | Do. |
| 136 | X | III | ----do---- | Do. |
| 137 | X | IV | ----do---- | Do. |
| 138 | X | V | Poor; red; discolored | Poor; red; discolored. |
| 139 | X | VI | Poor; orange; discolored | Poor; orange; discolored. |
| 140 | X | VII | Fair | Fair. |

[1] 200 milliliters of latex, rather than 100 milliliters as specified in the standard formulation above, were employed in the above examples 13 through 36.

In the examples of Table IV and Table V, a series of plant shines were formulated by simple mixing of a latex (or latices), optical brightening material or the like, and an aqueous dispersion of a non-ionic surfactant, said surfactant being 1 percent by weight of said aqueous dispersion, and said surfactant being a polyethoxylated octylphenol having the approximate formula p-$C_8H_{17}C_6H_4O(CH_2CH_2O)_{25}H$—that is, the product obtained by reacting para-octylphenol with approximately 25 moles of ethylene oxide under conditions well known to those versed in the pertinent art. It will be noted, in the following examples, that increasing concentrations of optical brightening material (within limits) tend to produce increases in overall performance of my plant shines, particularly in respect to brightness, sparkle, and visual brilliance; however, excessive concentrations of optical brightening material in some cases may have a tendency to produce thickening or even gelation of the plant shine formulations. Gelling tendencies may be reduced by adding small amounts of the non-ionic surfactant shown above; however, excessive concentrations of this surfactant may cause foaming.

*Table IV*

| Ex. No. | Latex Type | Latex Wt. (g.) | Modifier Type | Modifier Wt. (g.) | Surfactant dispersion wt. (g.) | Comments on performance as plant shine on *Pothos aureus* |
|---|---|---|---|---|---|---|
| 141 | A | 20 | | | | 1-hour: milky; tackless. 24-hour: cloudy; no dust. |
| 142 | A | 20 | | | 20 | Do. |
| 143 | A | 20 | I | 1.6 | 20 | Do. |
| 144 | D | 20 | | | | 1-hour: tacky; fair gloss. 24-hour: dusty; fair gloss. |
| 145 | D | 20 | | | 20 | Do. |
| 146 | D | 20 | I | 1.6 | 20 | 1-hour: tacky; good gloss. 24-hour: dusty; bright. |
| 147 | E | 20 | | | | 1-hour: slightly milky. 24-hour: dull; dusty. |
| 148 | E | 20 | | | 20 | Do. |
| 149 | E | 20 | I | 1.6 | 20 | 1-hour: no tack; fair gloss. 24-hour: very bright gloss. |
| 150 | I | 20 | | | | 1-hour: milky; tackless. 24-hour: cloudy; no dust. |
| 151 | I | 20 | | | 20 | Do. |
| 152 | I | 20 | I | 1.6 | 20 | Do. |
| 153 | J | 20 | | | | 1-hour: tacky; fair gloss. 24-hour: dusty; fair gloss. |
| 154 | J | 20 | | | 20 | Do. |
| 155 | J | 20 | I | 1.6 | 20 | 1-hour: tacky; good gloss. 24-hour: dusty; bright. |
| 156 | K | 20 | | | | 1-hour: slightly milky. 24-hour: dull; dusty. |
| 157 | K | 20 | | | 20 | Do. |
| 158 | K | 20 | III | 1.6 | 20 | 1-hour: no tack; fair gloss. 24-hour: very bright gloss. |

In the following examples, various proportions of polymethacrylate polymer ("Latex I"), polyacrylate polymer ("Latex J"), optical brightening material, and surfactant dispersion (water dispersion having 1 percent by weight of p-$C_8H_{17}C_6H_4O(CH_2CH_2O)_{25}H$ surfactant) were combined by simple mixing, and the resultant latices tested as plant shines.

*Table V*

| Ex. No. | Latex "I" wt. (g.) | Latex "J" wt. (g.) | Modifier Type | Modifier Wt. (g.) | Surfactant dispersion wt. (g.) | Comments on performance as plant shine on *Pothos aureus* |
|---|---|---|---|---|---|---|
| 159 | 66 | 34 | III | 0.1 | | 1-hour: milky; poor. 24-hour: milky; poor. |
| 160 | 66 | 34 | III | 5 | | Gelled. |
| 161 | 66 | 34 | III | 10 | | Do. |
| 162 | 66 | 34 | III | 0.1 | 100 | 1-hour: fair gloss. 24-hour: fair gloss. |
| 163 | 66 | 34 | III | 5 | 100 | 1-hour: good gloss. 24-hour: good gloss. |
| 164 | 66 | 34 | III | 10 | 100 | Do. |
| 165 | 66 | 34 | III | 0.1 | 400 | 1-hour: fair gloss. 24-hour: fair gloss. |
| 166 | 66 | 34 | III | 5 | 400 | 1-hour: fair to good. 24-hour: fair. |
| 167 | 66 | 34 | III | 10 | 400 | Do. |
| 168 | 50 | 50 | III | 0.1 | | 1-hour: good. 24-hour: good. |
| 169 | 50 | 50 | III | 5 | | Gelled. |
| 170 | 50 | 50 | III | 10 | | Do. |
| 171 | 50 | 50 | III | 0.1 | 100 | 1-hour: good. 24-hour: good. |
| 172 | 50 | 50 | III | 5 | 100 | 1-hour: very good gloss. 24-hour: very good gloss. |
| 173 | 50 | 50 | III | 10 | 100 | Do. |
| 174 | 50 | 50 | III | 0.1 | 400 | 1-hour: fair to good. 24-hour: fair to good. |
| 175 | 50 | 50 | III | 5 | 400 | 1-hour: good gloss. 24-hour: good gloss. |
| 176 | 50 | 50 | III | 10 | 400 | Do. |
| 177 | 34 | 66 | III | 0.1 | | 1-hour: good gloss; tacky. 24-hour: good gloss; tacky. |
| 178 | 34 | 66 | III | 5 | | Gelled. |
| 179 | 34 | 66 | III | 10 | | Do. |
| 180 | 34 | 66 | III | 0.1 | 100 | 1-hour: good gloss. 24-hour: good gloss. |
| 181 | 34 | 66 | III | 5 | 100 | 1-hour: very good gloss. 24-hour: very good gloss. |
| 182 | 34 | 66 | III | 10 | 100 | Do. |
| 183 | 34 | 66 | III | 0.1 | 400 | 1-hour: fair gloss. 24-hour: fair gloss. |
| 184 | 34 | 66 | III | 5 | 400 | 1-hour: good gloss. 24-hour: good gloss. |
| 185 | 34 | 66 | III | 10 | 400 | Do. |
| 186 | 50 | 50 | II | 0.1 | 100 | 1-hour: fair to good. 24-hour: fair to good. |
| 187 | 50 | 50 | II | 5 | 100 | 1-hour: good gloss. 24-hour: good gloss. |
| 188 | 50 | 50 | II | 10 | 100 | Do. |

FIFTH SERIES OF EXAMPLES

Preferred embodiments of my invention, of course, vary according to the intended end use. Embodiments of my invention—generally transparent or essentially transparent and generally colorless or essentially colorless—which have given good results in several diverse applications are set forth in the following examples:

EXAMPLE 189

The following ingredients were combined in the order as given:

|  | Grams |
|---|---|
| Water | 50 |
| Non-ionic surfactant of polyethoxylated octylphenol described above | 0.5 |
| "Optical Brightening Material III" | 4 |
| Defoaming agent of polydimethylsilanediol type described above | 0.05 |
| Perfume | 0.15 |
| "Latex I" | 13 |
| "Latex J" | 13 |

The dispersion obtained by simple mixing of the above ingredients was applied as a plant shine to a wide variety of household plants in a number of private residences in Arden Hills, Minnesota. In one case, it was applied to all leaf surfaces in a planter box about 7 feet long, facing a large picture window facing east-southeast, and about 13 feet from said picture window. This planter box was filled with *Pothos aureus, Sansevieria hahnii*, and *Nephthytis*, and after coating of the leaves all of these plants were found to have a most excellent, lasting, dust-free, glossy, and visually brilliant finish. Occasional dusting with a feather duster kept the leaves in this box in their original glossy conditoin, so that after eleven months the plants still appeared as if they had just been given a fresh coat of new plant shine. Moreover, all of the plants—most notably the *Pothos aureus*—looked larger and far healthier than ever before.

It should be appreciated that some optical brightening materials are more effective than others in the practice of my invention; accordingly, in the formulation of plant shines, as little as 0.1 part of optical brightening material per 100 parts of plant shine may produce a noticeable effect, while much larger concentrations of a different optical brightening material may be neccessary to produce an equivalent effect. Such differences, of course, can easily be determined by skilled formulators having the benefit of this disclosure.

EXAMPLE 190

A furniture polish with excellent leveling properties and excellent gloss, as compared to the best commercial household polishes in tests on finished (varnished) dark mahogany furniture, was obtained by combining the plant shine formulated as described in Example 189 with a shellac-ammonia dispersion (14 parts shellac, 2 parts 28 percent aqueous ammonia, and 84 parts water) in the ratio of 0.5 part shellac-ammonia dispersion per part of plant shine. Better gloss was obtained by increasing the proportion of plant shine in the formulation, and better leveling was obtained by increasing the proportion of shellac-ammonia dispersion. Relatively poor gloss, however, was observed in the polish film when the proportion of acrylic plastic was reduced below about 50 percent (solids basis), and the optical brightening material appeared to have little effect on the properties of the polish at acrylate content (i.e., acrylic content) less than about 25 percent by weight (solids basis).

EXAMPLE 191

A polish, which on vigorous buffing gave an excellent and remarkably abrasion-resistant finish on a varnished pine floor-board, was made by combining the following ingredients at 90° C. in the order as given, and then cooling the mixture gradually to room temperature with vigorous agitation:

| | Grams |
|---|---|
| "Latex I" | 25 |
| Oleic acid | 2 |
| Morpholine | 1.25 |
| "Optical Brightening Material III" | 3 |

This polish also showed promise in the finishing of floor tile.

Reasons for the most surprising synergistic effect I obtain—especially in compositions comprising optical brightening material with chlorophyll-containing plants—admittedly remain somewhat obscure. Certain of the effects observed are entirely unexpected, and in some cases are actually quite the reverse of what those versed in the pertinent art might expect. None of the prior art of which I am aware offers any anticipation of these synergistic effects, or any explanation thereof. (See, for example, Hill and Whittingham, "Photosynthesis," Methuen & Co., Ltd., London, 1953.) It should be understood that modifications and variations of my invention, as herein described, may be effected without departing from the scope of the novel concepts and such like of this invention, and that I do not intend that the breadth of my invention be limited in any way by the speculations, implicit or otherwise, herein contained concerning possible mechanisms which might usefully be considered in attempting to explain the remarkable synergistic effects actually observed.

I claim:

1. A process for treating chlorophyll-containing plants, in which there is applied to the surface of said plants aqueous dispersion containing from 56 to 90 parts by weight of liquid dispersing medium, from 44 to 10 parts by weight of film-forming, water-insoluble acrylic plastic, said acrylic plastic having an average molecular weight in excess of 10,000 and from 0.1 to 10 percent by weight of optical brightening material, said optical brightening material having substantial capacity for the absorption of light energy only of the ultraviolet and infrared regions of the spectrum, and drying of said dispersion to film on the surfaces of said plants.

2. A process for growing chlorophyll-containing plants, in which said plants are irradiated with sunlight through sheet material containing at least 25 percent by weight of acrylic plastic, and from 0.1 to 30 percent by weight of optical brightening material, said optical brightening material having substantial capacity for the absorption of light only of the ultraviolet and infrared regions of the spectrum.

References Cited in the file of this patent

UNITED STATES PATENTS

| | | |
|---|---|---|
| 2,046,886 | Strain | July 7, 1936 |
| 2,190,890 | Sellei | Feb. 20, 1940 |
| 2,386,855 | Horback | Oct. 16, 1945 |
| 2,420,168 | Dimmick | May 6, 1947 |
| 2,620,282 | Fry | Dec. 2, 1952 |
| 2,702,759 | Scalera et al. | Feb. 22, 1955 |
| 2,709,702 | Williams et al. | May 31, 1955 |
| 2,870,037 | Converse | Jan. 20, 1959 |

FOREIGN PATENTS

| | | |
|---|---|---|
| 214,444 | Australia | Apr. 11, 1958 |
| 770,889 | Great Britain | Mar. 27, 1957 |